United States Patent [19]

Nakamura

[11] Patent Number: 4,565,136

[45] Date of Patent: Jan. 21, 1986

[54] FLUIDIZED BED COMBUSTION FURNACE

[75] Inventor: Masahiro Nakamura, Yokosuka, Japan

[73] Assignee: Kawasaki Jukogyo Kabushiki Kaisha, Kobe, Japan

[21] Appl. No.: 724,795

[22] Filed: Apr. 19, 1985

Related U.S. Application Data

[63] Continuation of Ser. No. 585,342, Feb. 29, 1984, abandoned.

[30] Foreign Application Priority Data

Mar. 1, 1983 [JP] Japan ................................. 58-33085

[51] Int. Cl.$^4$ ............................................... F23G 5/30
[52] U.S. Cl. ................................. 110/245; 34/57 A; 110/263; 431/170; 432/58
[58] Field of Search ............... 110/245, 263, 298, 264; 431/7, 170; 122/4 D; 432/58; 34/57 A

[56] References Cited

U.S. PATENT DOCUMENTS

| | | | |
|---|---|---|---|
| 3,672,577 | 6/1972 | Kramer | 34/57 A |
| 3,746,516 | 7/1973 | Michaud | 432/58 |
| 3,813,217 | 5/1974 | Mousou | 34/57 A |
| 3,818,606 | 6/1974 | Marcellini | 34/57 A |
| 3,925,024 | 12/1975 | Hollingsworth et al. | 432/58 |
| 3,958,916 | 5/1976 | Barker et al. | 110/264 |
| 4,292,023 | 9/1981 | Defeo et al. | 110/245 |
| 4,320,089 | 3/1982 | Huttlin | 432/58 |
| 4,346,054 | 8/1982 | Lofgren et al. | 110/245 |
| 4,382,415 | 5/1983 | Korenberg | 34/57 A |
| 4,387,667 | 6/1983 | Goodstine et al. | 122/4 D |
| 4,390,501 | 6/1983 | Tanaami et al. | 432/58 |
| 4,402,665 | 9/1983 | Korenberg | 110/245 |

Primary Examiner—Albert J. Makay
Assistant Examiner—Steven E. Warner
Attorney, Agent, or Firm—Wenderoth, Lind & Ponack

[57] ABSTRACT

The air dispersion plate at a lower part of a fluidized bed combustion furnace is provided with a large number of air injection nozzles uniformly distributed therethroughout and made of a porous refractory material having good air permeability and high heat and wear resistances. All of the fluidizing air supplied into the wind box below the dispersion plate is injected through these nozzles into the combustion chamber to fluidize the fluidizable material, which, after combustion is stopped, cannot flow through the nozzles into the wind box to cause heat damage and contamination therein and in the air supply pipe.

10 Claims, 5 Drawing Figures

FLUIDIZED BED COMBUSTION FURNACE

This application is a continuation, of now abandoned application Ser. No. 585,342, filed Feb. 29, 1984, abandoned.

BACKGROUND OF THE INVENTION

This invention relates to fluidized bed combustion furnaces and more particularly to improvements in the devices provided in the horizontal dispersion plates at the bottom parts of such furnaces for injecting fluidizing air into the fluidizable beds.

Thermal apparatus utilizing the fluidized bed technique, such as coal-burning boilers, garbage incinerators, and wood-chip-burning boilers, have been and are being developed and reduced to practice.

In a typical conventional fluidized bed combustion furnace, a fluidizable substance in particulate or granular form is placed on a horizontal air dispersion plate at a bottom part of the furnace. The air dispersion plate is provided with a plurality of air injection nozzles or orifices disposed therein at equal spacing intervals for blowing air from a blast box or wind box below the air dispersion plate upward into the mass of the fluidizable substances. While the supply flow velocity of the air is low, the fluidizable substance is in a stationary or static state, but, when the air flow velocity exceeds the fluidization starting velocity of the fluidizable substance, the granules of the fluidizable substance are wafted upward and assume the state of a fluidized layer or bed which appears as though it were effervescing.

In the case where the fluidizable substance in this state of a fluidized bed is a combustible substance, continuous combustion becomes possible by causing it to ignite.

Then, when the supply of air through the air injection orifices is stopped, the fluidizable substance subsides and reassumes its original stationary state, and the fluidized bed combustion stops.

When the combustion thus stops, the fluidizable substance at a high temperature enters the air injection nozzles and drops into the wind box to cause contamination, clogging, and even heat damage in the air supply pipe connected to the wind box.

For this reason, it is the general practice at present to place a special cover or cap, made of a heat resistant steel plate and having air passage holes, over each of the air injection nozzles so as to prevent the granules of the fluidizable substance from entering into the air injection orifices.

However, even with the use of such caps, trouble such as heat damage and wear occur under the high-temperature environment within the combustion furnace. Furthermore, when the fluidized bed combustion is stopped, the pressure within the combustion chamber of the furnace is higher than that in the wind box. For this reason, even when the cap is used, the fluidizable substance at high temperatures enters through the air passage holes thereof and further enters into the air injection orifices to drop into the wind box, thereby causing contamination or heat damage to the wind box and the air supply pipe connected thereto.

Accordingly, it is necessary to supply air into the wind box so as to balance the pressure within the furnace combustion chamber and the pressure within the wind box when the fluidized bed combustion is stopped. However, since the pressure within the furnace combustion chamber decreases continuously, the pressure within the wind box must be reduced in correspondence therewith. Control of such an adjustment is extremely troublesome.

SUMMARY OF THE INVENTION

This invention has been developed with the aim of overcoming the above described problems encountered in the prior art and provides a fluidized bed furnace provided with air injection nozzles which are capable of preventing the fluidizable substance from dropping into the wind box at the time when the fluidized bed combustion is stopped, and which are not subject to heat damage and wear.

According to this invention, briefly summarized, there is provided a fluidized bed combustion furnace comprising a furnace structure enclosing a combustion chamber, an air dispersion plate at the bottom of the combustion chamber, and a wind box below the air dispersion plate for supplying fluidizing air therethrough into the combustion chamber, the air dispersion plate being provided with a large number of air injection nozzles uniformly distributed therethroughout at intervals, the air injection nozzles being made of a porous refractory material which has good air permeability, high heat resistance, and high wear resistance and being so constructed and supported in the air dispersion plate that the total quantity of fluidizing air injected and dispersed through the air dispersion plate must pass through the air injection nozzles.

The nature, utility, and further features of this invention will be more clearly apparent from the following detailed description with respect to preferred embodiments of the invention when read in conjunction with the accompanying drawings briefly described below.

DETAILED DESCRIPTION OF THE INVENTION

Figure 4:
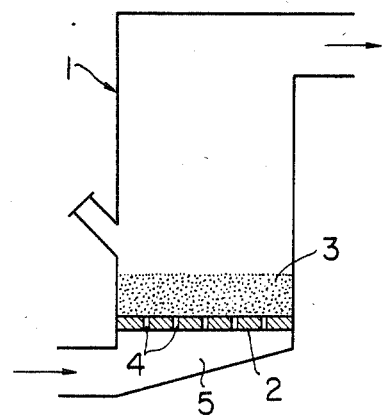
FIGS. 4 and 5 are simplified elevations, in vertical section, showing a typical conventional furnace of the fluidized bed type and respectively indicating the states wherein the injected air velocity is low and wherein it is high.
Figure 5:
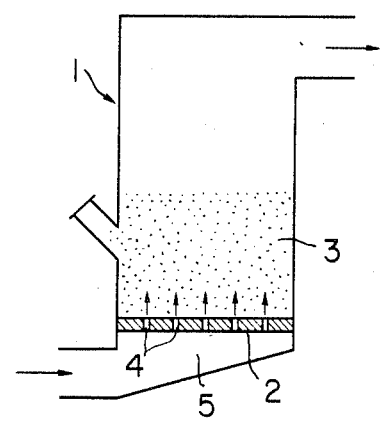

FIGS. 4 and 5 illustrate the aforedescribed typical conventional furnace of fluidized bed type. This combustion furnace 1 has at its bottom part an air dispersion plate 2, above which a fluidizable substance 3 is initially charged into the furnace combustion chamber. A wind box 5 is provided below the air dispersion plate 2 and functions to supply air through air injection orifices 4 formed in the air dispersion plate 2 into the furnace combustion chamber and against the fluidizable substance 3. A fluidized bed combustion furnace of this design has the objectional features described hereinbefore.

Figure 1:
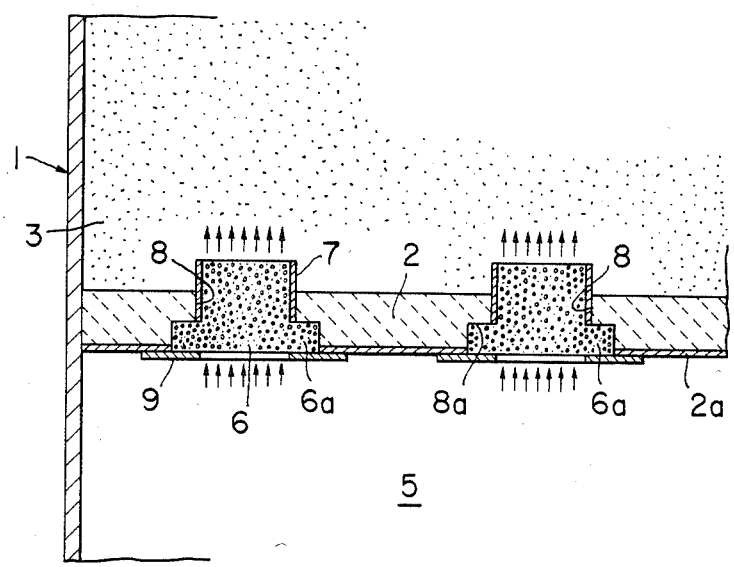
FIG. 1 is a fragmentary elevation, in vertical section, showing a lower portion of one example of the fluidized bed combustion furnace according to this invention.

Referring now to FIG. 1, the first example of the fluidized bed combustion furnace according to this invention has, at its lower part, a horizontal air dispersion plate 2 made of refractory material and having a large number of air injection nozzles 6 disposed therein at equal spacing intervals. The dispersion plate 2 has a lining 2a made, for example, of a heat resistant steel plate. Each nozzle 6 is made of a porous refractory material (e.g., porous refractory brick) and has a frusto-conical shape or a solid cylindrical shape with a bottom flange 6a as shown in FIG. 1. An outer cylindrical sleeve 7 made of a heat resistant metal is fitted around the upper cylindrical part of each nozzle 6 for the protection thereof and, in this state, is fitted upward from below the air dispersion plate 2 into and through one of several countersunk through holes 8, formed at constant space intervals through the plate 2, to project upward thereabove. The nozzle 6 thus fitted in the air dispersion plate 2 is held in this state by an annular support plate 9 secured by bolting to the lower surface of the plate 2. The flange 6a abuts on the shoulder 8a of each countersunk hole 8. Due to the engagement of the flange 6a with the shoulder 8a, the nozzle 6 is prevented from being blown away upward by the pressure in the wind box 5. The engagement of the flange 6a with the shoulder 8a is useful also because it facilitates correct positioning of the nozzle 6.

Each air injection nozzle 6 made of a porous refractory material has fine pores uniformly distributed therethroughout and has excellent porosity, moreover having a fine texture. This air injection nozzle 6 has excellent heat resistance and wear resistance at high temperatures and can be easily formed.

The sleeve 7 and the nozzle 6 project upward above the upper surface of the air dispersion plate 2 as shown. The protective sleeve 7 serves also to direct air flow upward which has passed through the nozzle 6.

Figure 2:
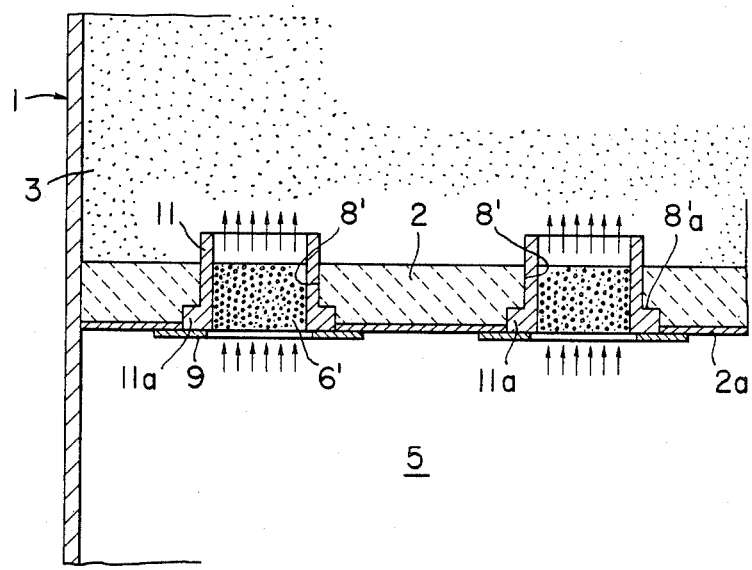
FIG. 2 is a similar elevation showing a lower portion of another example of the furnace of the invention.

In another form of the invention as illustrated in FIG. 2, the air dispersion plate 2 also has several air injection nozzles 6' made of a porous refractory material and having a solid cylindrical shape. Each nozzle 6' is fixedly fitted in a cylindrical protective sleeve 11 made of heat resistant metal having a flange 11a around its lower outer periphery. The cylindrical sleeve 11 holding the nozzle 6' therein is fitted upward from below the air dispersion plate 2 into and through one of several countersunk through holes 8', formed at constant space intervals through the plate 2, to project somewhat upward thereabove. The shoulder 8'a of the countersunk through hole 8' and the flange 11a are in abutting contact with each other, and prevent, as in the first embodiment, the nozzle 6' from being blown away upwardly, while facilitating correct positioning of the nozzle 6'. The sleeve 11 thus holding the nozzle 6' is held in place by an annular support plate 9 fixed to the lower surface of the plate 2.

Though the sleeve 11 projects somewhat upward above the dispersion plate 2, the nozzle 6' wherein has the upper surface which is at the same level as the upper surface of the dispersion plate 2. The upwardly projecting part of the sleeve 11 functions to guide the air upward which has passed through the nozzle 6'.

Figure 3:
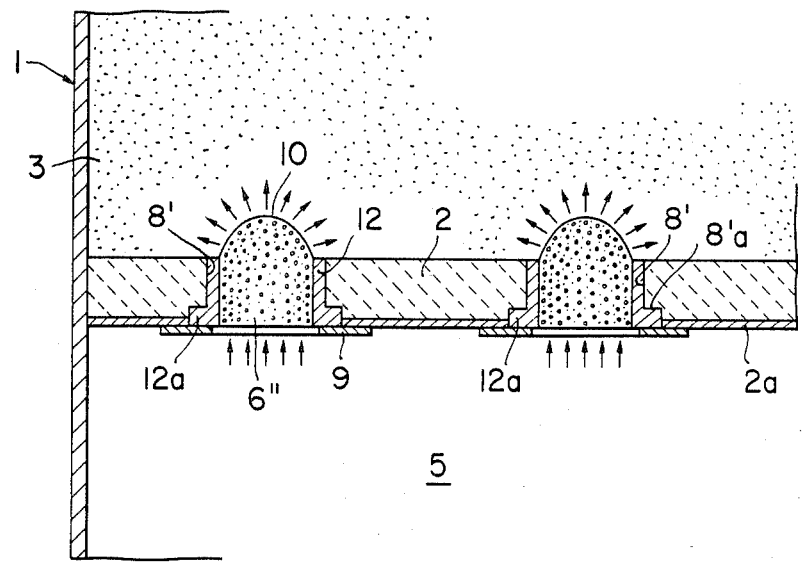
FIG. 3 is a similar elevation showing a lower portion of still another example of the furnace.

In still another form of this invention as shown in FIG. 3, the air injection nozzle 6" made of a porous refractory material has a solid cylindrical shape with a semispherical dome top 10. This nozzle 6" at its cylindrical part is fixedly held in a cylindrical sleeve 12 having a lower flange 12a, the upper dome top 10 of the nozzle 6" projecting upward above the upper rim of the sleeve 12. The dome top 10 serves to direct in various upward directions the air flow which has passed through the nozzle 6". Similarly as in the preceding embodiment, the cylindrical sleeve 12 is fitted upward from below the air dispersion plate 2 into and through one of several countersunk through holes 8', formed at constant space intervals through the plate 2, the upper rim of sleeve 12 being flush with the upper surface of the plate 2. The sleeve 12 is also held in place by an annular support plate 9 fixed to the lower surface of the plate 2.

In a fluidized bed combustion furnace provided with several air injection nozzles 6, 6', or 6" made of a porous refractory material, a fluidizable substance 3 is charged into the combustion chamber above the air dispersion plate 2 similarly as in FIG. 4. Then, when air for fluidization is supplied into the wind box 5, this fluidizing air is injected into the combustion chamber through the air injection nozzles 6, 6', or 6" made of porous refractory material and distributed uniformly in the combustion chamber.

As mentioned hereinbefore, the refractory material of the air injection nozzles 6, 6', or 6" has fine pores uniformly distributed therethroughout and has excellent porosity and air permeability. For this reason, ample fluidizing air is passed through the nozzles and injected into the combustion chamber, and its flow velocity reaches relatively quickly the fluidization starting velocity of the fluidizable substance 3, which thereupon is wafted upward and assumes the state of a fluidized bed. Accordingly, in the case where the fluidizable substance 3 is a combustible substance, when it is promptly ignited, fluidized bed combustion commences.

In this fluidized bed combustion, the air injection nozzles 6, 6', or 6" made of porous refractory material are in a high-temperature environment and are chafed by contact with the fluidized substance 3 during combustion. However, since these nozzles have excellent heat resistance and wear resistance, they are not subject to trouble such as burning, heat damage, and wear.

When the injection of fluidization air through the nozzles 6, 6', or 6" is stopped, the fluidized substance 3 is no longer wafted, sinks, and assumes the state of a stationary bed, and the fluidized bed combustion stops. At this time, since the pressure within the combustion chamber is high, the fluidizable substance 3 is urged to flow toward the wind box 5. However, the texture of porous nozzles 6, 6', or 6" is of a fineness such as to obstruct the penetration of the granules of the fluidizable substance 3 into the fine pores. Even if some small particles enter the fine pores on the upper or downstream surface of the nozzles, further infiltration will not occur. As a result, downward flow and dropping of the fluidizable substance 3 into the wind box 5 cannot occur.

As will be apparent from the foregoing description, in the fluidized bed combustion furnace of this invention, a large number of air injection nozzles made of porous refractory material having good air permeability afforded by uniformly distributed fine pores are provided at even spacing intervals in the air dispersion plate at a lower part of the furnace. For this reason, an ample flow of fluidizing air required for fluidized bed combustion can be supplied.

Furthermore, because of the excellent heat resistance and wear resistance of these air injection nozzles, there is little possibility of their being burned or damaged by heat or worn by abrasion, whereby these nozzles have a long serviceable life and afford great economy in maintenance. Still another advantageous feature of the furnace is that the air injection nozzles effectively stop reverse flow of the fluidizable substance into the wind box, whereby the wind box and the pipe supplying air thereto are fully protected from the hot fluidizable substance in the combustion chamber at the time when combustion is stopped.

What is claimed is:

1. In a fluidized bed combustion furnace having an air dispersion plate at a lower part thereof, the improvement wherein the air dispersion plate is provided with a large number of air injection nozzles uniformly distributed therethroughout at intervals, the air injection nozzles being made of a porous refractory material which has good air permeability, high heat resistance, and high wear resistance and being so constructed and supported in the air dispersion plate that the total quantity of fluidizing air injected and dispersed through the air dispersion plate must pass through the air injection nozzles, said air dispersion plate being formed with uniformly distributed countersunk through holes each having a downwardly directed shoulder formed integrally with the air injection nozzle, and each air injection nozzle being provided with a bottom flange, and wherein each nozzle is fitted in one of the countersunk holes with the bottom flange thereof abutting on the shoulder and means being provided to hold the nozzle in the countersunk hole.

2. A fluidized bed combustion furnace as claimed in claim 1, wherein the means to hold the nozzle is an annular support plate secured to the lower surface of the air dispersion plate.

3. A fluidized bed combustion furnace as claimed in claim 1, wherein a sleeve is fitted around the part of each nozzle other than the bottom flange.

4. A fluidized bed combustion furnace as claimed in claim 3, wherein the sleeve and the nozzle project upward above the upper surface of the air dispersion plate.

5. A fluidized bed combustion furnace as claimed in claim 1, wherein a sleeve is fitted around each nozzle and the shoulder is formed at the bottom part of the sleeve.

6. A fluidized bed combustion furnace as claimed in claim 5, wherein the sleeve projects upward above the upper surface of the air dispersion plate.

7. A fluidized bed combustion furnace as claimed in claim 6, wherein the upper surface of the nozzle is lower than the upper rim of the sleeve.

8. A fluidized bed combustion furnace as claimed in claim 5, wherein the upper rim of the sleeve is flush with the upper surface of the air dispersion plate.

9. A fluidized bed combustion furnace as claimed in claim 8, wherein the nozzle has an upper dome top projecting upward above the upper surface of the air dispersion plate.

10. In a fluidized bed combustion furnace having an air dispersion plate at a lower part thereof, the improvement wherein the air dispersion plate is provided with a large number of air injection nozzles uniformly distributed therethroughout at intervals, the air injection nozzles being made of a porous refractory material which has good air permeability, high heat resistance, and high wear resistance and being so constructed and supported in the air dispersion plate that the total quantity of fluidizing air injected and dispersed through the air dispersion plate must pass through the air injection nozzles, said air dispersion plate being formed with uniformly distributed countersunk through holes each having a downwardly directed shoulder, and each air injection nozzle being provided with a bottom flange, and wherein each nozzle is fitted in one of the countersunk holes with the bottom flange thereof abutting on the shoulder and means being provided to hold the nozzle in the countersunk hole, and wherein a sleeve which projects upward above the upper surface of the air dispersion plate is fitted around each nozzle and the shoulder is formed at the bottom part of the sleeve, the upper surface of the nozzle being lower than the upper rim of the sleeve.

* * * * *